(12) United States Patent
Slusarczyk et al.

(10) Patent No.: US 11,680,620 B2
(45) Date of Patent: Jun. 20, 2023

(54) TELESCOPIC DAMPER ASSEMBLY

(71) Applicant: BeijingWest Industries Co., Ltd, Beijing (CN)

(72) Inventors: Pawel Slusarczyk, Cracow (PL); Jakub Wrzesinski, Cracow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 76 days.

(21) Appl. No.: 17/326,935

(22) Filed: May 21, 2021

(65) Prior Publication Data

US 2021/0372499 A1 Dec. 2, 2021

Related U.S. Application Data

(60) Provisional application No. 63/030,907, filed on May 27, 2020.

(30) Foreign Application Priority Data

May 10, 2021 (CN) .......................... 202110504826.1

(51) Int. Cl.
*F16F 9/06* (2006.01)
*F16F 9/32* (2006.01)
(Continued)

(52) U.S. Cl.
CPC .............. *F16F 9/065* (2013.01); *F16F 9/062* (2013.01); *F16F 9/067* (2013.01); *F16F 9/3221* (2013.01);
(Continued)

(58) Field of Classification Search
CPC .. F16F 9/088; F16F 9/061; F16F 9/064; F16F 9/48; F16F 2222/12; F16F 2224/0208;
(Continued)

(56) References Cited

U.S. PATENT DOCUMENTS 1,576,152 A 3/1926 Staats-Oels
3,363,894 A 1/1968 Hill
(Continued)

FOREIGN PATENT DOCUMENTS

CN 101287926 A 10/2008
CN 108343698 7/2018
(Continued)

OTHER PUBLICATIONS

Extended European Search Report dated Feb. 14, 2022 for counterpart European patent application No. 21174669.8.
(Continued)

*Primary Examiner* — Thomas J Williams
*Assistant Examiner* — James K Hsiao
(74) *Attorney, Agent, or Firm* — William H. Honaker; Dickinson Wright PLLC

(57) ABSTRACT

A damper assembly comprises a main tube extending along a center axis between a first end and a second end defining a fluid chamber. A main piston is disposed in the fluid chamber dividing the fluid chamber into a compression chamber and a rebound chamber. A piston rod extends along the center axis coupled to the main piston. An external tube extends about the main tube and defines a compensation chamber therebetween. The external tube includes a protrusion extending radially inwardly from an opened end to abut the main tube. An external piston is located in the compensation chamber and coupled to the main tube, dividing the compensation chamber into a first compartment and a second compartment. The first compartment extends between the protrusion and the external piston for containing a working fluid. The second compartment extends between the closed end and the external piston for containing a gas.

14 Claims, 4 Drawing Sheets

(51) Int. Cl.
  *B60G 13/08* (2006.01)
  *B60G 17/08* (2006.01)
  *F16F 9/34* (2006.01)
  *F16F 9/48* (2006.01)
  *F16F 9/50* (2006.01)
  *F16F 9/348* (2006.01)

(52) U.S. Cl.
  CPC .............. *F16F 9/3235* (2013.01); *F16F 9/34* (2013.01); *F16F 9/48* (2013.01); *F16F 9/50* (2013.01); *B60G 13/08* (2013.01); *B60G 17/08* (2013.01); *B60G 2202/24* (2013.01); *B60G 2204/62* (2013.01); *B60G 2206/41* (2013.01); *B60G 2500/104* (2013.01); *B60G 2600/21* (2013.01); *B60G 2800/162* (2013.01); *F16F 9/348* (2013.01); *F16F 2222/12* (2013.01); *F16F 2228/066* (2013.01); *F16F 2230/18* (2013.01); *F16F 2230/42* (2013.01); *F16F 2232/08* (2013.01); *F16F 2234/02* (2013.01)

(58) Field of Classification Search
  CPC ........... F16F 2224/025; F16F 2228/066; F16F 2230/007; F16F 2232/08; F16F 2234/02; B60G 13/08; B60G 2202/24; B60G 2204/62; B60G 2206/41; B60G 2500/104; B60G 2600/21; B60G 2800/162; B60G 2206/73; B60G 2206/7102; B60G 2500/10; B60G 17/08
  See application file for complete search history.

(56) References Cited

U.S. PATENT DOCUMENTS

| | | | |
|---|---|---|---|
| 3,391,922 A | 7/1968 | Axthammer | |
| 4,235,317 A * | 11/1980 | Maciejewski | F16F 9/303 267/152 |
| 4,287,970 A * | 9/1981 | Eusemann | F16F 9/364 188/269 |
| 4,381,857 A | 5/1983 | Cook | |
| 4,405,119 A * | 9/1983 | Masclet | B60G 15/12 188/289 |
| 4,647,026 A * | 3/1987 | Siemann | F16F 9/516 188/315 |
| 4,973,854 A * | 11/1990 | Hummel | F16F 9/063 188/322.14 |
| 5,246,247 A | 9/1993 | Runkel | |
| 5,263,559 A * | 11/1993 | Mettner | F16F 9/466 188/266.5 |
| 5,529,519 A * | 6/1996 | Nakamura | B63H 20/10 440/61 R |
| 5,570,762 A | 11/1996 | Jentsch et al. | |
| 5,593,007 A * | 1/1997 | Siltanen | F16F 9/185 188/320 |
| 6,161,821 A * | 12/2000 | Leno | B60G 17/0416 188/322.19 |
| 6,390,258 B1 * | 5/2002 | Hofmann | F16F 9/362 188/322.16 |
| 6,619,445 B2 * | 9/2003 | Forster | F16F 9/062 188/315 |
| 7,299,907 B2 * | 11/2007 | Ferkany | F16F 9/088 188/322.19 |
| 7,413,064 B2 * | 8/2008 | Furuya | B62K 25/08 188/282.1 |
| 7,540,362 B2 * | 6/2009 | Knaust | F16F 9/0272 188/300 |
| 7,740,256 B2 * | 6/2010 | Davis | B60G 3/20 280/124.16 |
| 8,317,004 B2 | 11/2012 | Martin et al. | |
| 9,186,950 B2 * | 11/2015 | Wootten | B60G 17/0416 |
| 9,371,880 B2 * | 6/2016 | Michel | F16F 9/185 |
| 10,029,758 B2 * | 7/2018 | McAndrews | B62K 3/02 |
| 10,214,071 B1 | 2/2019 | Dillenbeck | |
| 10,393,205 B2 * | 8/2019 | Tao | F16F 9/063 |
| 10,598,246 B2 | 3/2020 | Hinz | |
| 2002/0112931 A1 | 8/2002 | Forster | |
| 2002/0175035 A1 * | 11/2002 | Achenbach | F16F 9/084 188/315 |
| 2006/0163016 A1 | 7/2006 | Ferkany | |
| 2011/0079475 A1 * | 4/2011 | Roessle | F16F 9/18 188/266.5 |
| 2011/0101579 A1 | 5/2011 | Polakowski et al. | |
| 2015/0145188 A1 | 5/2015 | Polakowski et al. | |
| 2015/0165861 A1 | 6/2015 | Allen et al. | |
| 2018/0355938 A1 | 12/2018 | Tao | |
| 2019/0072147 A1 | 3/2019 | Bandy | |
| 2019/0381848 A1 | 12/2019 | Barefoot et al. | |

FOREIGN PATENT DOCUMENTS

| | | |
|---|---|---|
| CN | 108518442 A | 9/2018 |
| CN | 208153605 U | 11/2018 |
| CN | 110206844 A | 9/2019 |
| CN | 110785579 A | 2/2020 |
| DE | 1995279 U | 10/1968 |
| DE | 10228454 | 3/2003 |
| EP | 267543 | 5/1988 |
| EP | 1153228 | 8/2003 |
| FR | 2530763 A1 | 1/1984 |
| GB | 2348473 A | 4/2000 |
| GB | 2348473 A | 10/2000 |

OTHER PUBLICATIONS

EP Invitation pursuant to Rule 63(1) EPC dated Oct. 18, 2021 for counterpart EP patent application No. EP21174669.8.

First Office Action and Search Report dated May 27, 2022 for counterpart Chinese patent application No. 202110504826.1, along with machine EN translation downloaded from EPO.

* cited by examiner

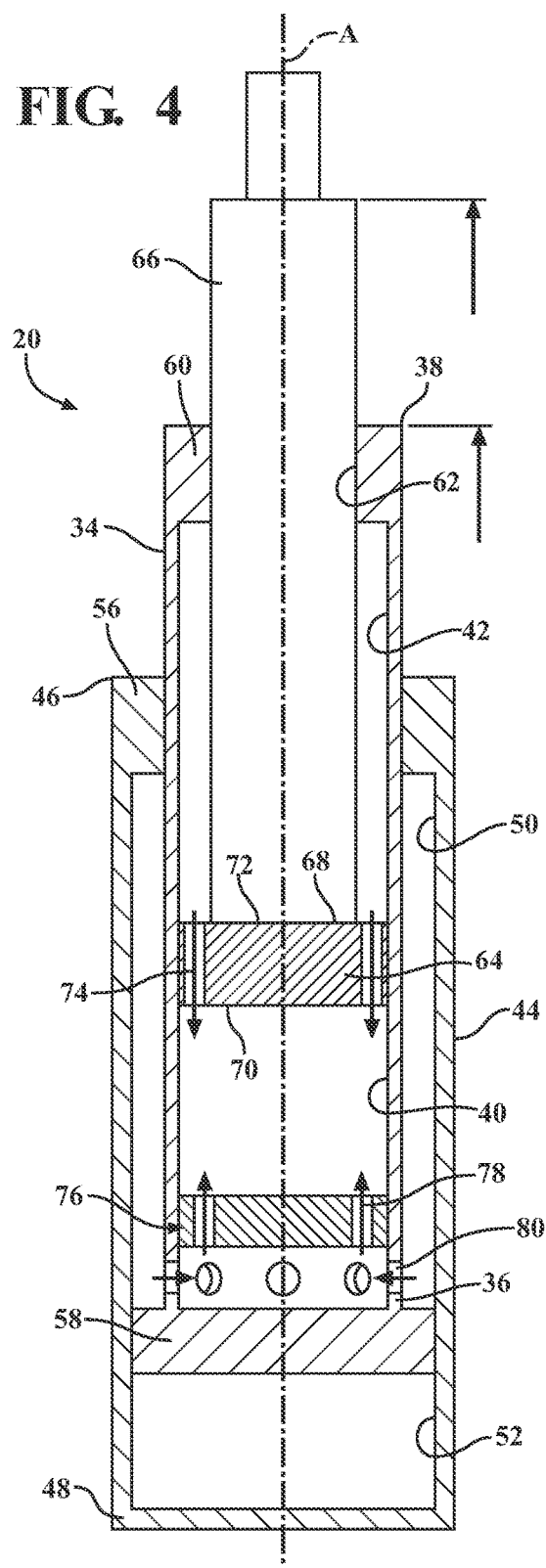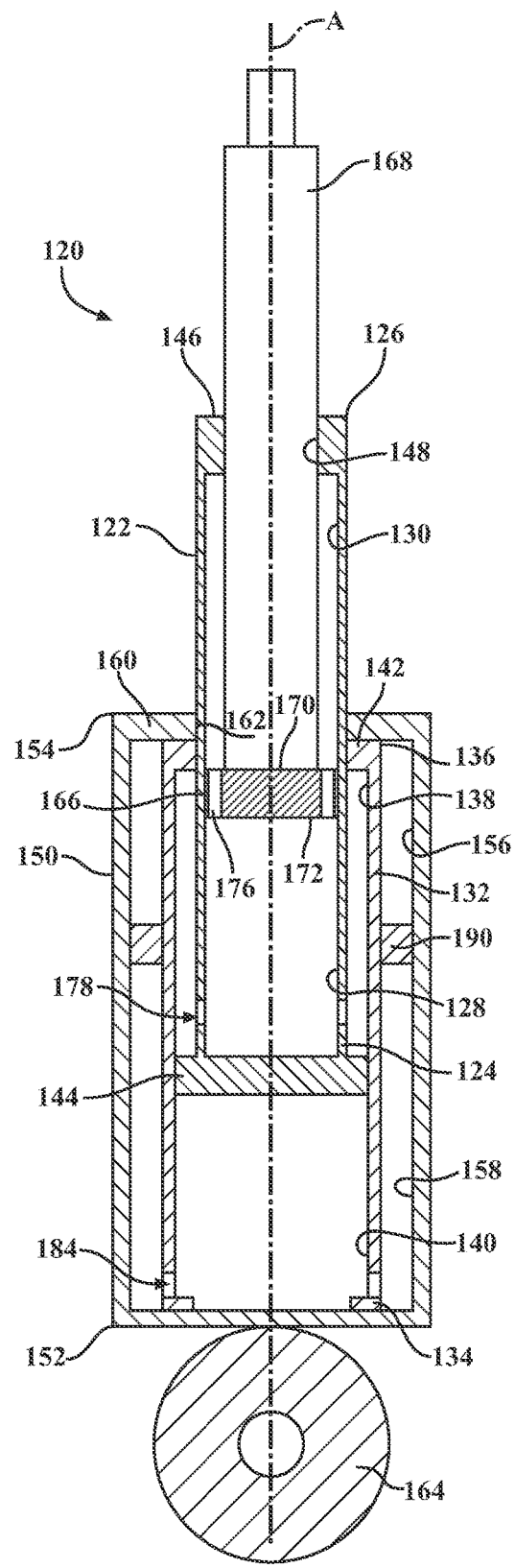

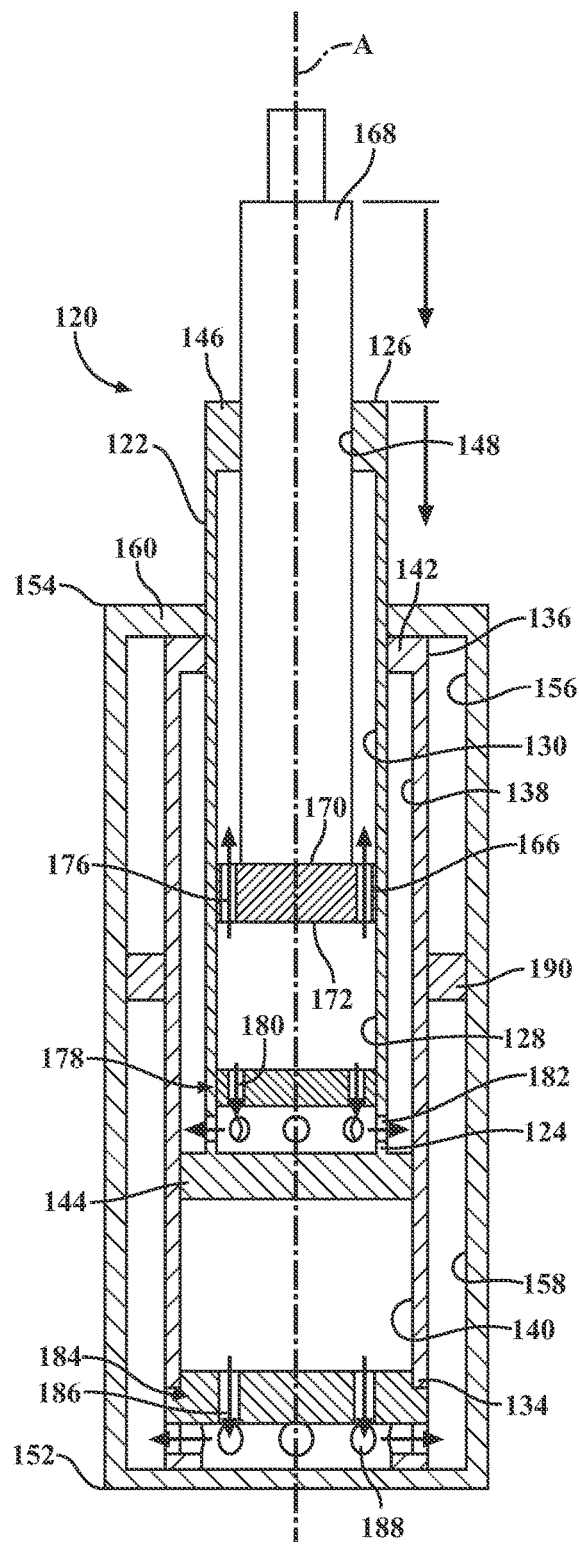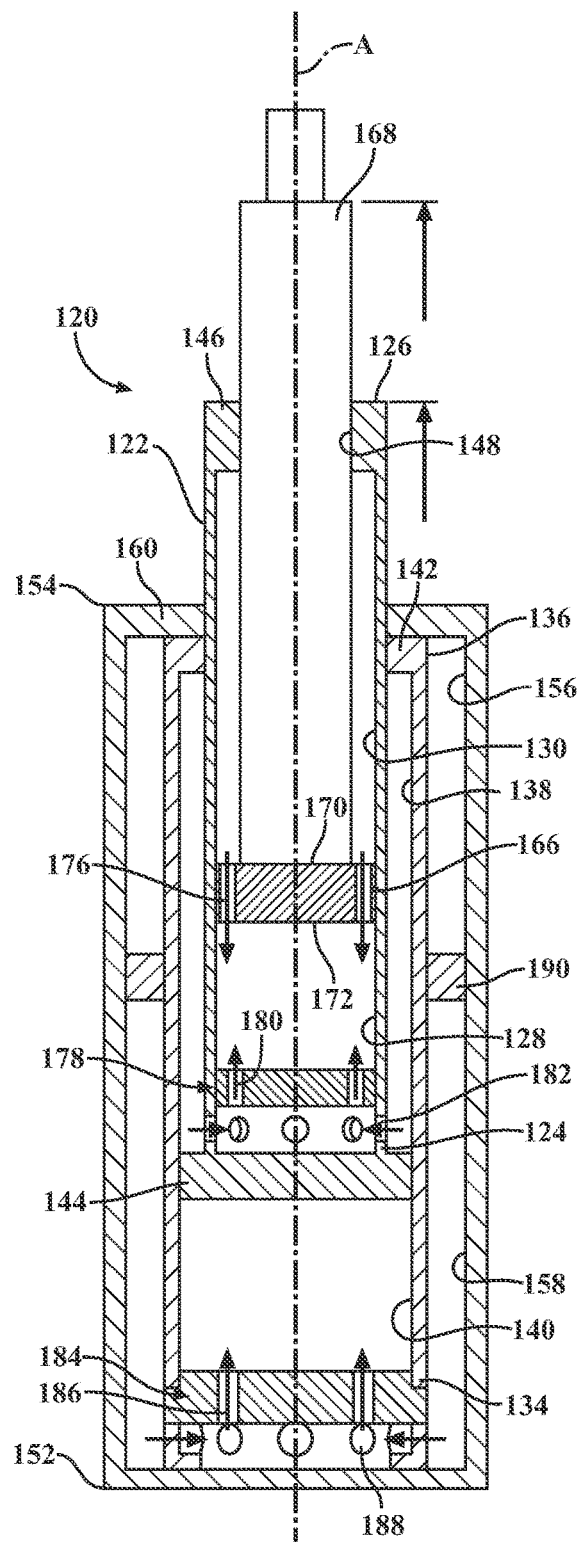

TELESCOPIC DAMPER ASSEMBLY

CROSS-REFERENCE TO RELATED APPLICATIONS

This application claims the benefit of U.S. Provisional Application Patent Ser. No. 63/030,907, filed on May 27, 2020, and CN application No. 202110504826.1 filed on May 10, 2021, the entire disclosures of which is hereby incorporated herein by reference in their entirety.

BACKGROUND OF THE INVENTION

1. Field of the Invention

The present invention relates generally to a damper assembly for a vehicle and, in particular a telescopic damper assembly.

2. Description of the Prior Art

Suspension systems are provided to filter or isolate the vehicle's body (sprung portion) from the vehicle's wheels and axles (unsprung portion) when the vehicle travels over vertical road surface irregularities as well as to control body and wheel motion. In addition, suspension systems are also used to maintain an average vehicle attitude to promote improved stability of the vehicle during maneuvering. The typical passive suspension system includes a spring and a damping device in parallel with the spring which are located between the sprung portion and the unsprung portion of the vehicle.

Due to an increase in the complexity of vehicle body and suspension, the length of a shock absorber or damper assembly becomes more and more critical because it has a direct impact in the installation and the cost of the vehicle body.

One such a damper assembly is disclosed in U.S. Pat. No. 6,619,445. The damper assembly comprises a main tube extending along a center axis between a first end and a second end. The main tube defines a fluid chamber extending therebetween for containing a working fluid. A main piston is slidably disposed in the fluid chamber dividing the fluid chamber in to a compression chamber and a rebound chamber. A piston rod extends along the center axis and coupled to the main piston for moving the main piston between a compression stroke and a rebound stroke. An external tube, radially spaced apart from the main tube, extends about the main tube between a closed end and an opened end. The closed end is adjacent the first end. The opened end is adjacent to the second end. The external tube and the main tube define a compensation chamber extending therebetween.

SUMMARY OF THE INVENTION

The present invention provides a damper assembly that minimizes damper dimension while maintaining the same stroke length. The present invention also provides a damper assembly having simplified design which lowers the cost of the vehicle body.

It is one aspect of the present invention to provide a damper assembly. The damper assembly comprises a main tube extending along a center axis between a first end and a second end. The main tube defines a fluid chamber extending therebetween for containing a working fluid. A main piston is slidably disposed in the fluid chamber dividing the fluid chamber in to a compression chamber and a rebound chamber. A piston rod extends along the center axis and coupled to the main piston for moving the main piston between a compression stroke and a rebound stroke. An external tube, radially spaced apart from the main tube, extends about the main tube between a closed end and an opened end. The closed end is adjacent the first end. The opened end is adjacent to the second end. The external tube includes a protrusion which extends radially inwardly from the opened end toward the center axis and abuts the main tube. The external tube and the main tube define a compensation chamber extending between the external tube and the main tube. An external piston is located in the compensation chamber coupled to the main tube for axial movement with the main tube relative to the external tube. The external piston divides the compensation chamber into a first compartment and a second compartment. The first compartment extends between the protrusion and the external piston for containing the working fluid. The second compartment extends between the closed end and the external piston for containing a gas.

It is another aspect of the present invention to provide a damper assembly. The damper assembly comprises a main tube extending along a center axis between a first end and a second end. The main tube defines a fluid chamber extending between the first end and the second end for containing a working fluid. A main piston is slidably disposed in the fluid chamber dividing the fluid chamber in to a compression chamber and a rebound chamber. A piston rod extends along the center axis coupled to the main piston for moving the main piston between a compression stroke and a rebound stroke. A middle tube is radially spaced apart from the main tube and extending about the main tube between a primary end adjacent the first end and a secondary end adjacent to the second end. The main tube is slidable in the middle tube. The middle tube and the main tube define a compensation chamber extending therebetween. An external tube is radially spaced apart from the middle tube. The external tube extends about the middle tube between a closed end adjacent to the primary end and an opened end adjacent to the secondary end. The external tube and the middle tube define an external chamber extending therebetween. A partitioning member is located in the external chamber extending about the middle tube dividing said external chamber into a gas compartment and a liquid compartment. The gas compartment extends between the opened end and the partitioning member. The liquid compartment extends between the closed end and the partitioning member.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a cross-sectional perspective view of the damper assembly during a rebound stroke;

FIG. 5 is a cross-sectional perspective view of the damper assembly constructed in accordance with another embodiment of the present invention;

FIG. 6 is a cross-sectional perspective view of the damper assembly during a compression stroke; and FIG. 7 is a cross-sectional perspective view of the damper assembly during a rebound stroke.

DESCRIPTION OF THE ENABLING EMBODIMENT

Figure 1:
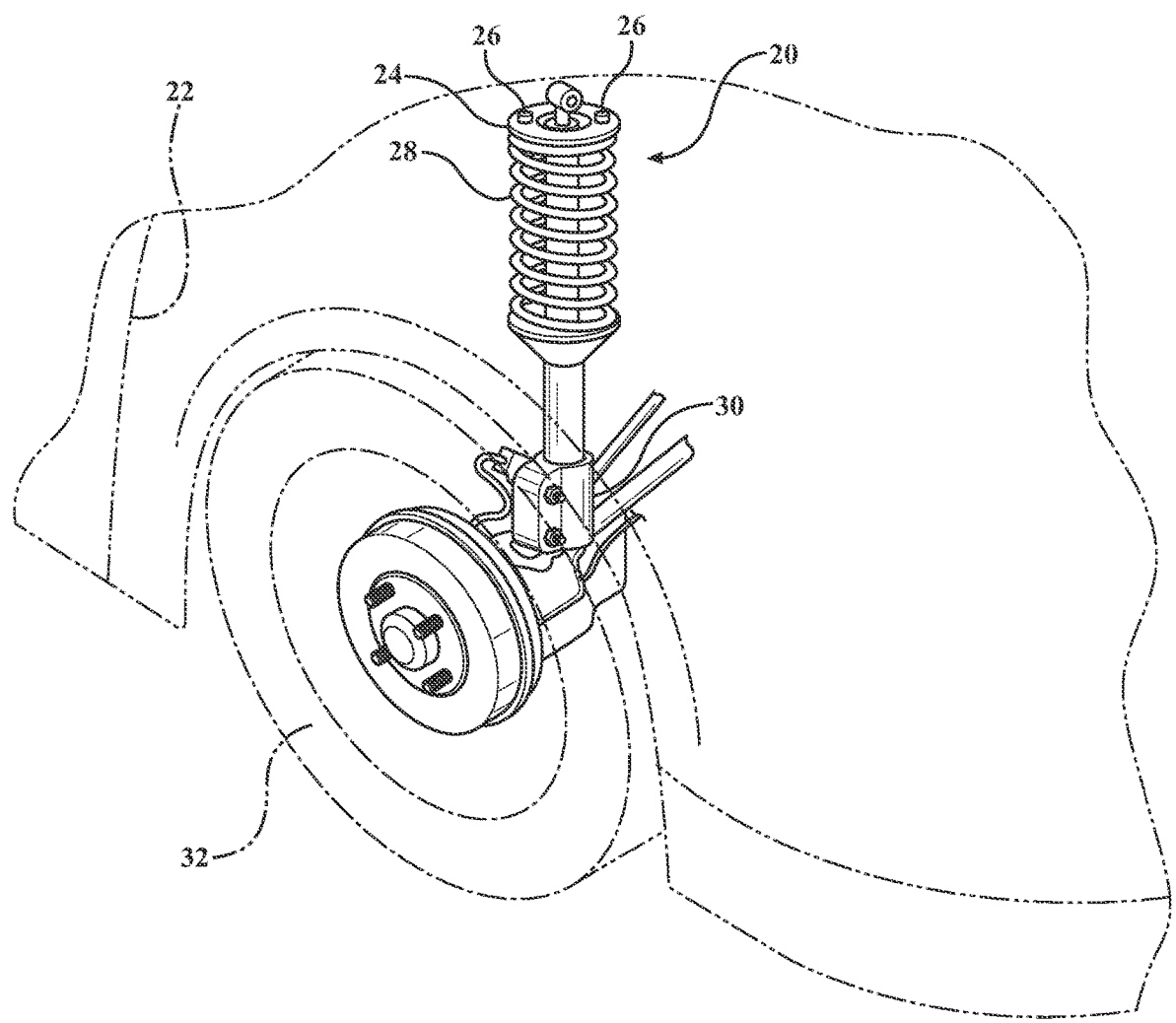
FIG. 1 is a fragmentary view of a vehicle suspension including a damper assembly constructed in accordance with one embodiment of the present invention.

Referring to the Figures, wherein like numerals indicate corresponding parts throughout the several views, FIG. 1 illustrates a fragment of an exemplary vehicle suspension including the damper assembly 20 coupled to a vehicle chassis 22 via a top mount 24 and a number of screws 26 disposed on a periphery of an upper surface of the top mount 24. The top mount 24 connects to a coil spring 28. The damper assembly 20 connects to the steering knuckle 30 supporting vehicle wheel 32.

Figure 2:
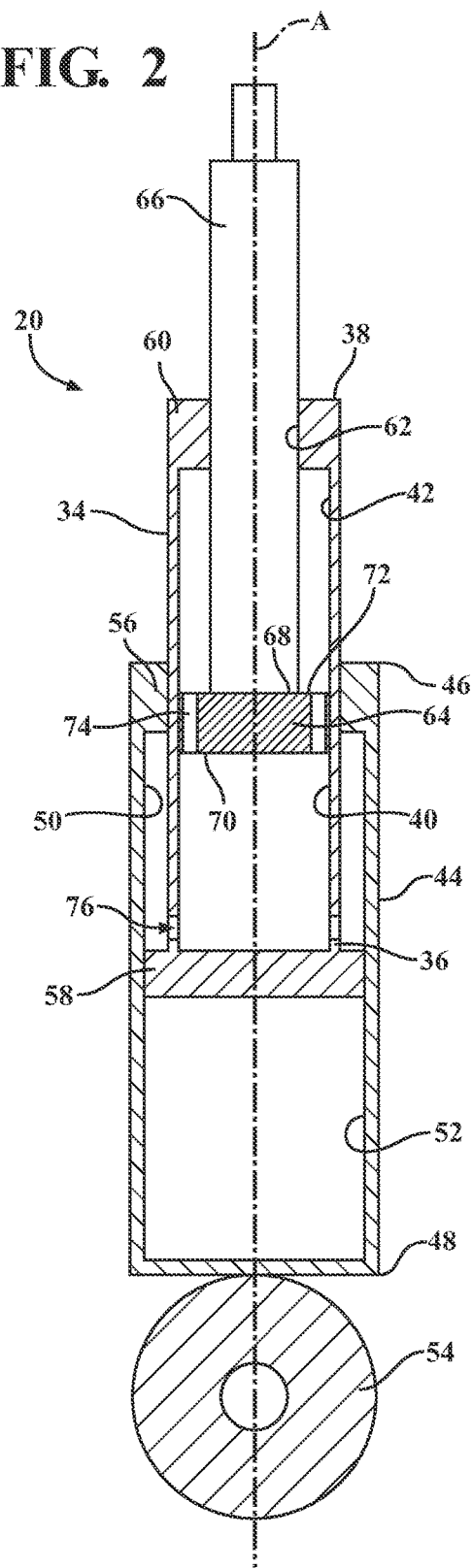
FIG. 2 is a cross-sectional perspective view of the damper assembly constructed in accordance with one embodiment of the present invention.

The damper assembly 20 constructed according to the present invention can have a high pressure design or a low pressure design. A high pressure design damper assembly constructed in accordance with an embodiment of the present invention is generally shown in FIG. 2. The damper assembly 20 comprises a main tube 34, having a generally cylindrical shape, extending on a center axis A between a first end 36 and a second end 38. The main tube 34 defines a fluid chamber 40, 42 extending along the center axis A between the first end 36 and the second end 38 for containing a working fluid.

An external tube 44, having a generally cylindrical shape, is disposed on the center axis A radially spaced from the main tube 34. The external tube 44 extends about the main tube 34 between an opened end 46 and a closed end 48. The closed end 48 is located adjacent the first end 36 of the main tube 34. The opened end 46 is located adjacent to the second end 38 of the main tube 34. The main tube 34 is axially movable relative to the external tube 44. The external tube 44 and the main tube 34 define a compensation chamber 50, 52 extending between the external tube 44 and the main tube 34 and annularly about the center axis A. A mounting ring 54 is located at the closed end 48 of the external tube 44 and coupled to the closed end 48 of the external tube 44 for connecting the damper assembly 20 to the vehicle.

A protrusion 56 extends radially inwardly from the opened end 46 of the external tube 44 toward the center axis A and in an abutment relationship with the main tube 34 to close the compensation chamber 50, 52. An external piston 58, having a generally cylindrical shape, is located in the compensation chamber 50, 52 and couples to the first end 36 of the main tube 34 for axially movement with the main tube 34. The external piston 58 divides the compensation chamber 50, 52 into a first compartment 50 and a second compartment 52. The first compartment 50 extends between the protrusion 56 and the external piston 58 for containing the working fluid. The second compartment 52 is located between the closed end 48 and the external piston 58 for containing a gas. A projection 60 is located at the second end 38 of the main tube 34 and extends radially inwardly toward the center axis A to close the fluid chamber 40, 42. The projection 60 defines a bore 62, having a generally circular shape centered on the center axis A.

A main piston 64, having a generally cylindrical shape, is located in the fluid chamber 40, 42 slidable along the center axis A dividing the fluid chamber 40, 42 into a compression chamber 40 and a rebound chamber 42. The compression chamber 40 extends between the first end 36 and the main piston 64 and in fluid communication with the first compartment 50 of the compensation chamber 50, 52. The rebound chamber 42 extends between the second end 38 and the main piston 64.

Figure 3:
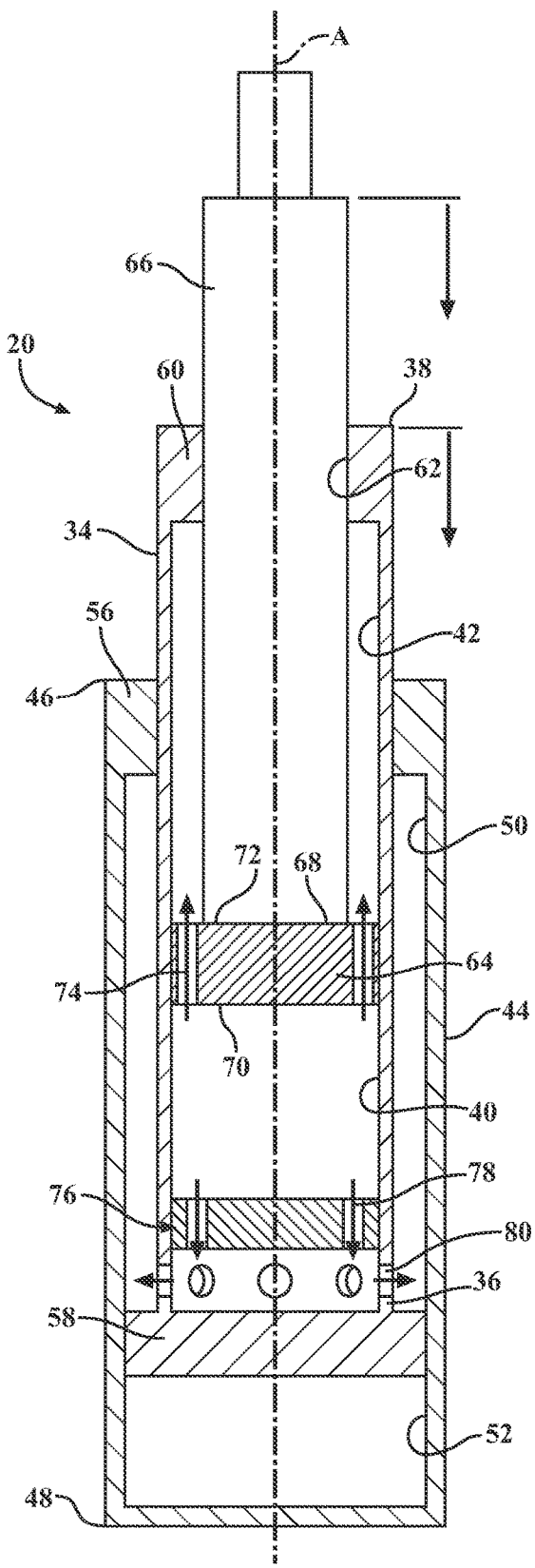
FIG. 3 is a cross-sectional perspective view of the damper assembly during a compression stroke.

A piston rod 66, having a generally cylindrical shape, extends along the center axis A through the bore 62 to a distal end 68. The distal end 68 of the piston rod 66 couples to the main piston 64 for moving the main piston between a compression stroke and a rebound stroke. During the compression stroke, as best illustrated in FIG. 3, the piston rod 66 and the main piston 64 move toward the first end 36 of the main tube 34 and the closed end 48 of the external tube 44. During the rebound stroke, as best illustrated in FIG. 4, the main piston 64 and the piston rod 66 move toward the second end 38 of the main tube 34 and the opened end 46 of the external tube 44.

According to an embodiment of the present invention, the piston rod 66 can have a length that is similar or equal to the length of the main tube 34. This way, during the compression stroke and the rebound stroke, the displacement of the piston rod 66 can be twice the length of the main tube 34. With the main tube 34 being movable relative to the external tube 44, synchronous displacement of the piston rod 66 and the main tube 34 can be possible with proper selection of the volume of the piston rod 66 and the first compartment 50 of the compensation chamber 50, 52. For example, according to an embodiment of the present invention, cross-sectional area of the piston rod 66 can be equivalent to the cross-section of the first compartment 50 between the external tube 44 and the main tube 34.

According to an embodiment of the present invention, a change in volume of the piston rod 66 inside the main tube 34 may be equal to a change in volume of the first compartment 50 of the compensation chamber 50, 52, providing a synchronous displacement of the piston rod 66 and the main tube 34 along the center axis A. According to an embodiment of the present invention, a cross-sectional area of the piston rod 66 may be equivalent to a cross-sectional area of the first compartment 50 of the compensation chamber 50, 52, providing a synchronous displacement of the piston rod 66 and the main tube 34 along the center axis A.

The main piston 64 has a compression surface 70 and a rebound surface 72. The compression surface 70 is disposed in the compression chamber 40 facing the closed end 48. The rebound surface 72 is disposed in the rebound chamber 42 facing the opened end 46. The main piston 64 defines at least one passage 74 extending through the main piston 64 for allowing the working fluid to flow through the main piston 64 during the compressions stroke and the rebound stroke. According to an embodiment of the present invention, the at least one passage 74 can include a plurality of passages having a set of inner passages (not shown) and a set of outer passage (not shown). The inner passages are located adjacent to the center axis A and extending between the rebound surface 72 and the compression surface 70 for allowing the working fluid to flow through the inner passages during the compression stroke. The outer passages are radially spaced from the inner passages and extending between the rebound surface 72 and the compression surface 70 for allowing the working fluid to flow through the outer passages during said rebound stroke.

A compression valve (not shown) including a plurality of discs, each disc of the plurality of discs having a generally circular shape, can be disposed on the rebound surface 72 of the main piston 64 covering the outer passages for limiting the flow of the working fluid through the main piston 64 to provide a damping force during the compression stroke. A rebound valve (not shown) including a plurality of discs, each disc of the plurality of discs having a generally circular shape, can be disposed on the compression surface 70 of the main piston 64 covering the inner passages for limiting the flow of the working fluid through the main piston 64 to provide a damping force during the rebound stroke.

A base valve 76, having a generally cylindrical shape, is located in the compression chamber 40 axially spaced apart from the first end 36 and couples to the main tube 34. The base valve 76 defines at least one conduit 78 extending through the base valve 76 and in fluid communication with the compression chamber 40 for restricting fluid flow through the base valve 76 during the compression stroke or the rebound stroke. According to an embodiment of the present invention, the at least one conduit 78 can include a plurality of conduits 78 disposed about the center axis A and circumferentially spaced apart from one another.

The main tube 34 defines at least one orifice 80, located adjacent to the first end 36 of the main tube 34 between the base valve 76 and the external piston 58, in fluid communication with the first compartment 50 of the compensation chamber 50, 52 for allowing fluid flow from the compression chamber 40 to the first compartment 50. According to an embodiment of the present invention, the at least one orifice 80 can include a plurality of orifices 80 disposed about the center axis A and circumferentially spaced from one another.

In operation, the damper assembly 20 can be movable between an extended position and a compact position. In the extended position, the piston rod 66 is moved away from the closed end 48 of the external tube 44 wherein the main piston 64 is adjacent to the projection 60 of the main tube 34 and the external piston 58 is adjacent to the protrusion 56 of the external tube 44, thereby defining a maximum damper length for the damper assembly 20. In the compact position, the piston rod 66 is moved toward the closed end 48 of the external tube 44. Accordingly, along with the piston rod 66, the main tube 34 is also moved toward the closed end 48 of the external tube 44, whereby the main piston 64 is located adjacent to the external piston 58 and the projection 60 of the main tube 34 can be located adjacent to the protrusion 56 to reduce the length of the damper assembly 20.

During the compression stroke, as best illustrated in FIG. 3, the piston rod 66 and the main tube 34 move toward the closed end 48 of the external tube 44. As the piston rod 66 moves toward the closed end 48, the working fluid located in the compression chamber 40 is pushed through the at least one passage 74 of the main piston 64 toward the rebound chamber 42 to provide a damping force. At the same time, movement of the piston rod 66 toward the closed end 48 pushes the working fluid, such as oil, through the base valve 76 and the orifices 80 and into the first compartment 50 of the compensation chamber 50, 52. Pressure under the external piston 58, applied by the main tube 34, and the filling of the first compartment 50 causes the external piston 58 to move toward the closed end 48 of the external tube 44, compressing a gas in the second compartment 52 and thus providing an additional damping force.

During the rebound stroke, as best illustrated in FIG. 4, the piston rod 66 and the main tube 34 move away from the closed end 48 of the external tube 44. As the piston rod 66 moves away from the closed end 48, the working fluid located in the rebound chamber 42 is pushed through the at least one passage 74 of the main piston 64 toward the compression chamber 40 to provide a damping force. At the same time, as the piston rod 66 moves away from the closed end 48, the main piston 64 also draws the working fluid to the rebound chamber 42 from the first compartment 50 of the compensation chamber 50, 52 through the base valve 76 to provide an additional damping force.

In summary, during the compression and rebound strokes, the synchronous movement of the piston rod 66 and the main tube 34 allows the damper assembly 20 to move from the extended position to the compacted position and vice-versa. It can be appreciated that the synchronous movement of the piston rod 66 and the main tube 34 can be ensured by appropriate placement of the piston rod 66 and the first compartment 50 of the compensation chamber 50, 52 and their appropriate volumes selection. In other words, it can be important to maintain a ratio of the cross-section of the piston rod 66 and the first compartment 50 of the compensation chamber 50, 52. For example, according to an embodiment of the present invention, a cross-sectional area of the piston rod 66 can be equivalent to the cross-section of the first compartment 50 of the compensation chamber 50, 52.

A low pressure design of the damper assembly 120 constructed in accordance with an embodiment of the present invention is generally shown in FIG. 5. The damper assembly 120 comprises a main tube 122, having a generally cylindrical shape, extending along a center axis A between a first end 124 and a second end 126. The main tube defines a fluid chamber 128, 130 extends along the center axis A between the first end 124 and the second end 126 for containing a working fluid.

A middle tube 132, having a generally cylindrical shape, is disposed on the center axis A radially spaced apart from the main tube 122. The middle tube 132 extends about the main tube 122 between a primary end 134 and a secondary end 136. With the damper assembly 120 in a compact position, the primary end 134 is located adjacent the first end 124 of the main tube 122, and the secondary end 136 is located adjacent to the second end 126 of the main tube 122. The main tube 122 is axially movable relative to the middle tube 132. The middle tube 132 defines a compensation chamber 138, 140 extending annularly about the center axis A. A protrusion 142 extends radially inwardly from the secondary end 136 of the middle tube 132 toward the center axis A and in an abutment relationship with the main tube 122 to enclose the compensation chamber 138, 140.

An external piston 144, having a generally cylindrical shape, is located in the compensation chamber 138, 140 coupled to the first end 124 of the main tube 122 for axial movement with the main tube 122. The external piston 144 divides the compensation chamber 138, 140 into a first compartment 138 and a second compartment 140 for containing the working fluid. The first compartment 138 extends between the protrusion 142 and the external piston 144. The second compartment 140 extends between the primary end 134 of the middle tube 132 and the external piston 144. A projection 146 is located at the second end 126 of the main tube 122 extending radially inwardly toward the center axis A to close the fluid chamber 128, 130. The projection 146 defines a bore 148, having a generally circular shape, located on the center axis A in fluid communication with the fluid chamber 128, 130.

An external tube 150, having a generally cylindrical shape, is disposed on the center axis A radially spaced apart from the middle tube 132. The external tube 150 extends about the middle tube 132 between a closed end 152 and an opened end 154. The closed end 152 is located adjacent to the primary end 134 of the middle tube 132 and the opened end 154 is located adjacent to the secondary end 136 of the middle tube 132. The external tube 150 and the middle tube 132 define an external chamber 156, 158 extending between the middle tube 132 and the external tube 150 and annularly about the center axis A. A retaining member 160 extends radially inwardly from the opened end 154 of the external tube 150 and in an abutment relationship with the main tube 122. The retaining member 160 is axially adjacent and in an abutment relationship with the protrusion 142 of the middle tube 132 for securing the middle tube 132 in the external tube 150 between the retaining member 160 and the closed end 152. The retaining member 160 defines a hole 162 located on the center axis A. The hole 162 is axially aligned with the bore 148, with both the bore 148 and the hole 162 being sized to receive the piston rod 168 and to seal therewith to prevent fluid from escaping as the piston rod 168 moves relative to the main tube 122 and/or the external tube 150. According to an embodiment of the present invention, the retaining member 160 is in an abutment relationship with the protrusion 142 to retain the middle tube 132 in the external tube 150. A mounting ring 164 is located at the closed end 152 of the external tube 150 coupled to the closed end 152 of the external tube 150 for connecting the damper assembly 120 to the vehicle.

A main piston 166, having a generally cylindrical shape, is located in the fluid chamber 128, 130 and slidable along the center axis A. The main piston 166 divides the fluid chamber 128, 130 into a compression chamber 128 and a rebound chamber 130. The compression chamber 128 extends between the first end 124 and the main piston 166 wherein the compression chamber 128 is in fluid communication with the first compartment 138 of the compensation chamber 138, 140. The rebound chamber 130 extends between the second end 126 and the main piston 166. A piston rod 168, having a generally cylindrical shape, extends along the center axis A through the bore 148 and the hole 162 to a distal end. The distal end of the piston rod 168 couples to the main piston 166 for moving the main piston 166 between a compression stroke and a rebound stroke. During the compression stroke, as best illustrated in FIG. 6, the main piston 166 and the piston rod 168 move toward the first end 124 of the main tube 122 and the closed end 152 of the external tube 150. During the rebound stroke, as best illustrated in FIG. 6, the main piston 166 and the piston rod 168 move toward the second end 126 of the main tube 122 and the opened end 154 of the external tube 150.

The main piston 166 has a compression surface 172 and a rebound surface 170. The compression surface 172 is located in the compression chamber 128 facing the closed end 152. The rebound surface 170 is located in the rebound chamber 130 facing the second end 126. The main piston 166 defines at least one passage 176 extending through the main piston 166 to allow the working fluid to flow through the main piston 166 during the compression stroke and the rebound stroke.

According to an embodiment of the present invention, the at least one passage 176 can include a set of inner passages (not shown) and a set of outer passages (not shown). The inner passages are located adjacent to the center axis A and extending between the rebound surface 170 and the compression surface 172. The outer passages are spaced radially outwardly from the inner passages. The outer passages extend between the rebound surface 170 and the compression surface 172. The main piston 166 may be configured to cause the working fluid, such as oil, to pass through the outer passages during the compression stroke and through the inner passages during the rebound stroke. For example, one or more valves may control the flow of the working fluid through the inner and outer passages.

A compression valve (not shown) including a plurality of discs, each disc of the plurality of discs having a generally circular shape, can be disposed on the rebound surface 170 of the main piston 166 covering the outer passages for limiting the flow of the working fluid through the main piston 166 to provide a damping force during the compression stroke. A rebound valve (not shown) including a plurality of discs, each disc of the plurality of discs having a generally circular shape, can be disposed on the compression surface 172 of the main piston 166 covering the inner passages for limiting the flow of the working fluid through the main piston 166 to provide a damping force during the rebound stroke.

A base valve 178, having a generally cylindrical shape, is located in the compression chamber 128 axially spaced apart from the first end 124 and coupled to the main tube 122. The base valve 178 defines at least one conduit 180 extending through the base valve 178 and in fluid communication with the compression chamber 128 for restricting fluid flow through the base valve 178 during the compression stroke or the rebound stroke. According to an embodiment of the present invention, the at least one conduit 180 includes a plurality of conduits 180 disposed about the center axis A and circumferentially spaced apart from one another.

The main tube 122 defines at least one orifice 182, located adjacent to the first end 124 of the main tube 122 between the base valve 178 and the external piston 144 for allowing fluid flow from the compression chamber 128 to the first compartment 138. According to an embodiment of the present invention, the at least one orifice 182 can include a plurality of orifices 182 disposed about the center axis A circumferentially spaced apart from one another and in fluid communication with the first compartment 138 of the compensation chamber 138, 140.

An end valve 184, having a generally cylindrical shape and located in the second compartment 140 of the compensation chamber 138, 140 between the closed end 152 of the external tube 150 and the primary end 134 of the middle tube 132. The end valve 184 is coupled to the primary end 134 of the middle tube 132. The end valve 184 defines at least one channel 186 extending through the end valve 184 for regulating fluid flow through the end valve 184. According to an embodiment of the present invention, the at least one channel 186 can include a plurality of channels 186 disposed about the center axis A and circumferentially spaced apart from one another. The end valve 184 defines at least one perforation 188 located adjacent to the closed end 152 of the external tube 150 and in fluid communication with a corresponding one of the channels 186. According to an embodiment of the present invention, the at least one perforation 188 can include a plurality of perforations 188 disposed about the center axis A, circumferentially spaced from one another, in fluid communication with the external chamber 156, 158. Together, the channels 186 and the perforations 188 allow fluid flow from the second compartment 140 to the liquid compartment 158 of the external chamber 156, 158 and vice-versa.

A partitioning member 190, having a generally circular shape, is located in the external chamber 156, 158 and extending about the middle tube 132 dividing the external chamber 156, 158 into a gas compartment 156 and a liquid compartment 158. The gas compartment 156 extends between the retaining member 160 and the partitioning member 190. The liquid compartment 158 extends between the closed end 152 of the external tube 150 and the partitioning member 190.

According to an embodiment of the present invention, the piston rod 168 can have a length that is equal to, or approximately equal to, a length of the main tube 122. This way, during the compression stroke and the rebound stroke, the displacement of the piston rod 168 can be approximately twice the length of the main tube 122. With the main tube 122 being movable relative to the external tube 150, synchronous displacement of the piston rod 168 and the main tube 122 can be possible with proper selection of the volume of the piston rod 168 and the first compartment 138 of the compensation chamber 138, 140. For example, according to an embodiment of the present invention, a cross-sectional area of the piston rod 168 can be equivalent to a cross-section area of the first compartment 138 of the compensation chamber 138, 140.

In operation, the damper assembly 120 can be movable between an extended position and a compact position. In the extended position, the piston rod 168 is moved away from the closed end 152 of the external tube 150 wherein the main piston 166 is adjacent to the projection 146 of the main tube 122 and the external piston 144 is adjacent to the protrusion 142 of the external tube 150, thereby defining a maximum damper length for the damper assembly 120. In the compact position, the piston rod 168 is moved toward the closed end 152 of the external tube 150. Accordingly, along with the piston rod 168, the main tube 122 is also moved toward the closed end 152 of the external tube 150, whereby the main piston 166 is located adjacent to the external piston 144 and the projection 146 of the main tube 122 can be located adjacent to the protrusion 142.

During the compression stroke, as best illustrated in FIG. 6, the piston rod 168 and the main tube 122 move toward the closed end 152 of the external tube 150. As the piston rod 168 moves toward the closed end 152, the working fluid located in the compression chamber 128 is pushed through the at least one passage 176 of the main piston 166 toward the rebound chamber 130 to provide a damping force. At the same time, the as the piston rod 168 moves toward the closed end 152, the main piston 166 also pushes the working fluid in the compression chamber 128 to the first compartment 138 of the compensation chamber 138, 140 through the base valve 178 to provide an additional damping force. As the working fluid being pushed through the base valve 178, the working fluid accumulates in the first compartment 138 of the compensation chamber 138, 140 thereby increasing the fluid pressure in the first compartment 138. In response to the pressure build up in the first compartment 138, the working fluid in the first compartment 138 pushes the external piston 144 and the main tube 122 toward the closed end. Accordingly, the working fluid in the second compartment 140 is pushed to the liquid compartment 158 of the external chamber 156, 158 through the end valve 184 to provide further damping during the compression stroke. According to an embodiment of the present invention, during the compression stroke, the piston restriction, i.e. restrictions resulting from fluid flow through the passage 176 of the main piston 166, are less than the restriction of the base valve 178 i.e. restrictions resulting from fluid flow through the conduits 180 and orifices 182; Likewise, the restriction of the base valve 178 are less than the restriction of the end valve 184, i.e. restrictions resulting from fluid flow through the channel 186 and the perforations 188 of the end valve 184. For example, the end valve 184 may provide the highest restriction during the compression stroke.

During the rebound stroke, as best illustrated in FIG. 7, the piston rod 168 and the main tube 122 move away from the closed end 152 of the external tube 150. As the piston rod 168 moves away from the closed end 152, the working fluid located in the rebound chamber 130 is pushed through the at least one passage 176 of the main piston 166 toward the compression chamber 128 to provide a damping force. At the same time, the as the piston rod 168 moves away from the closed end 152, the main piston 166 also draws the working fluid to the compression chamber 128 from the first compartment 138 of the compensation chamber 138, 140 through the base valve 178 to provide an additional damping force. As the main tube 122 moves away from the closed end 152, the external piston 144 draws the working fluid to the second compartment 140 of the compensation chamber 138, 140 through the end valve 184 to further to provide further damping during the rebound stroke. According to an embodiment of the present invention, during the rebound stroke, the piston restriction, i.e. restrictions resulting from fluid flow through the passage 176 of the main piston 166, are greater than the restriction of the base valve 178 i.e. restrictions resulting from fluid flow through the conduits 180 and orifices 182; Likewise, the restriction of the base valve 178 are less than the restriction of the end valve 184, i.e. restrictions resulting from fluid flow through the channel 186 and the perforations 188 of the end valve 184.

One or more of the valves 76, 178, 184 may be configured for double-sided operation, causing some restriction to fluid flow in one direction and a relatively higher restriction to fluid flow in an opposite direction. For example, one or more of the valves 76, 178, 184 may consist of an orifice, one or more clamped deflective discs, and calibrated holes for tuning the amount of restriction to fluid flow over a wide range of damper velocities in the compression stroke and/or the rebound stroke. In some embodiments, each of the valves 76, 178, 184 may be configured for double-sided operation, consisting of an orifice, one or more clamped deflective discs, and calibrated holes.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims.

What is claimed is:

1. A damper assembly comprising:
    a main tube extending along a center axis between a first end and a second end and defining a fluid chamber extending therebetween for containing a working fluid;
    a main piston engaging with the main tube and slidably disposed in said fluid chamber dividing said fluid chamber in to a compression chamber and a rebound chamber;
    a piston rod extending along said center axis and coupled to said main piston for moving said main piston between a compression stroke and a rebound stroke;
    an external tube radially spaced apart from said main tube and extending about said main tube between a closed end and an opened end, said closed end being adjacent said first end and said opened end being adjacent to said second end, said external tube including a protrusion extending radially inwardly from said opened end toward the center axis and abutting said main tube, said external tube and said main tube defining a compensation chamber extending therebetween; and
    an external piston located in said compensation chamber and coupled to said main tube for axial movement with said main tube relative to said external tube, said external piston dividing said compensation chamber into a first compartment and a second compartment with said first compartment extending between said protrusion and said external piston for containing the working fluid and said second compartment extending between said closed end and said external piston for containing a gas, wherein the damper assembly further includes a base valve entirely located in said compression chamber, axially spaced apart from said first end, and coupled to said main tube, wherein said base valve defines at least one conduit extending through said base valve and in fluid communication with said compression chamber for restricting flow through said base valve, wherein the at least one conduit is located radially inward of the main tube, wherein said main tube defines at least one orifice located adjacent to said first end between said base valve and said external piston and in fluid communication with said first compartment.

2. The damper assembly according to claim 1, wherein said at least one conduit includes a plurality of conduits disposed about said center axis and circumferentially spaced apart from one another.

3. The damper assembly according to claim 1, wherein said at least one orifice includes a plurality of orifices disposed about said center axis and circumferentially spaced apart from one another.

4. The damper assembly according to claim 1, wherein said piston rod has a length equal to a length of said main tube.

5. The damper assembly according to claim 1, wherein a cross-sectional area of said piston rod is equivalent to a cross-sectional area of said first compartment between the external tube and the main tube, thereby allowing a synchronous displacement of said piston rod and said main tube along said center axis.

6. The damper assembly according to claim 1, wherein a change in volume of said piston rod inside said main tube is equal to a change in volume of said first compartment of said compensation chamber, providing a synchronous displacement of said piston rod and said main tube along said center axis.

7. A damper assembly comprising:
a main tube extending along a center axis between a first end and a second end defining a fluid chamber extending therebetween for containing a working fluid;
a main piston engaging with the main tube and slidably disposed in said fluid chamber dividing said fluid chamber in to a compression chamber and a rebound chamber;
a piston rod extending along said center axis and coupled to said main piston for moving said main piston between a compression stroke and a rebound stroke;
a middle tube radially spaced apart from said main tube and extending about said main tube between a primary end adjacent said first end and a secondary end adjacent to said second end, said main tube being slidable in said middle tube, said middle tube and said main tube defining a compensation chamber extending therebetween;
an external tube radially spaced apart from said middle tube, said external tube extending about said middle tube between a closed end adjacent to said primary end and an opened end adjacent to said secondary end, said external tube and said middle tube defining an external chamber extending therebetween;
a partitioning member located in said external chamber and extending about said middle tube dividing said external chamber into a gas compartment and a liquid compartment, said gas compartment extending between said opened end and said partitioning member and said liquid compartment extending between said closed end and said partitioning member;
an external piston coupled to said main tube and dividing said compensation chamber into a first compartment and a second compartment; and
a base valve entirely located in said compression chamber, axially spaced apart from said first end, and coupled to said main tube,
wherein said base valve defines at least one conduit extending through said base valve and in fluid communication with said compression chamber for restricting flow through said base valve, wherein the at least one conduit is located radially inward of the main tube,
wherein said main tube defines at least one orifice located adjacent to said first end between said base valve and said external piston and in fluid communication with said first compartment.

8. The damper assembly according to claim 7, wherein said middle tube is retained in said external tube.

9. The damper assembly according to claim 7, further including an end valve located in said second compartment between said closed end of said external tube and said primary end of said middle tube, said end valve being coupled to said primary end of said middle tube.

10. The damper assembly according to claim 9, wherein said end valve defines at least one channel extending through said end valve for regulating fluid flow through said end valve.

11. The damper assembly according to claim 9, wherein said end valve defines at least one perforations located adjacent to said closed end for allowing fluid flow from said second compartment to said external chamber.

12. The damper assembly according to claim 7, wherein said piston rod has a length equal to a length of said main tube.

13. The damper assembly according to claim 7, wherein a change in volume of said piston rod inside said main tube is equal to a change in volume of said first compartment, providing a synchronous displacement of said piston rod and said main tube along said center axis.

14. The damper assembly according to claim 7, wherein a cross-sectional area of said piston rod is equivalent to a cross-sectional area of said first compartment, providing a synchronous displacement of said piston rod and said main tube along said center axis.

* * * * *